Dec. 26, 1922.
R. I. SHIBIYA.
VALVE LIFTER.
FILED JULY 9, 1921.
1,440,317.
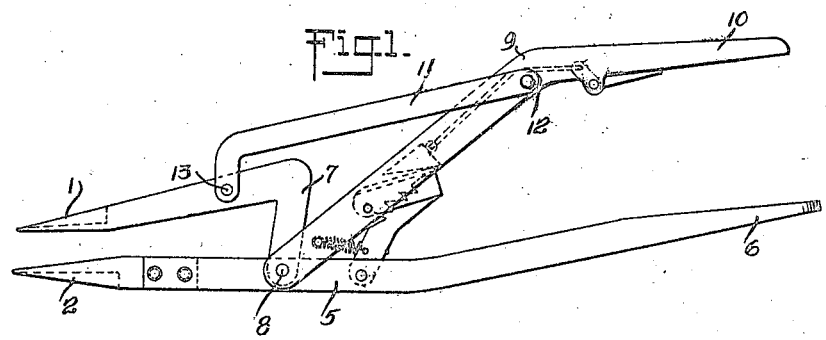
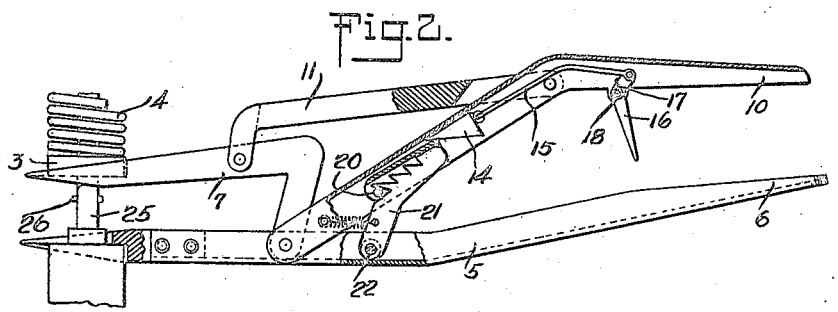
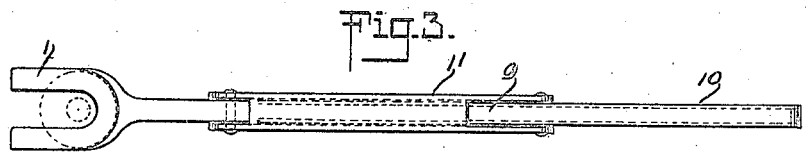
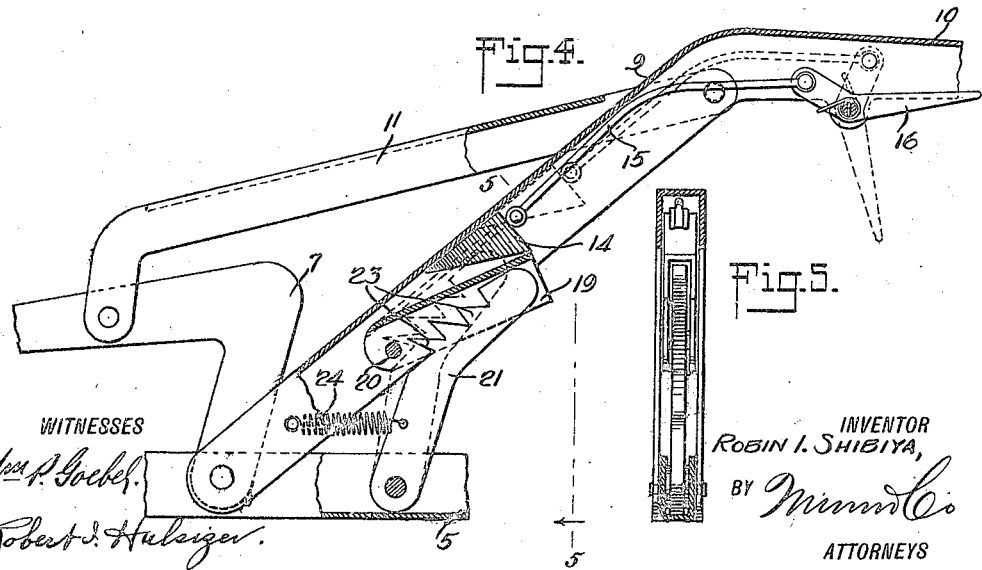
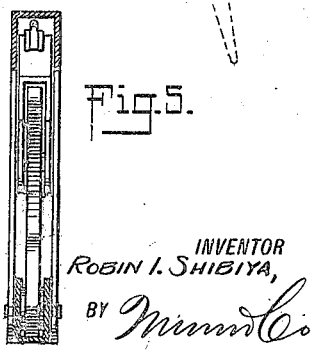
WITNESSES
INVENTOR
ROBIN I. SHIBIYA,
BY
ATTORNEYS Patented Dec. 26, 1922.

1,440,317

UNITED STATES PATENT OFFICE.

ROBIN I. SHIBIYA, OF OMAHA, NEBRASKA.

VALVE LIFTER.

Application filed July 9, 1921. Serial No. 483,620.

*To all whom it may concern:*

Be it known that I, ROBIN I. SHIBIYA, a subject of the Emperor of Japan, and a resident of Omaha, in the county of Douglas and State of Nebraska, have invented a new and Improved Valve Lifter, of which the following is a full, clear, and exact description.

This invention relates to a valve lifting device, and has for an object the provision of a simple, compact, strong, efficient tool whereby valve springs may be lifted and held in an elevated position while the stems of the valves, to which they are usually connected, are being removed, together with the valves, for purposes of repair.

Another object resides in the provision of means whereby after the tool has been operated to lift the valve the handles can be left in place and are locked in their operative position while the mechanic is removing the valve, so that the valve and its stem can be replaced after having been repaired and properly assembled before the spring is released.

A further object resides in the particular construction and arrangement of parts which are hereinafter described and claimed and shown in the accompanying drawings.

The invention is illustrated in the drawings, of which—

Figure 1 is a side view of the device;

Figure 2 is a side elevation partly in section showing the locking means in a position to effect the locking of the tool in its operative position;

Figure 3 is a plan view of the tool;

Figure 4 is an enlarged detail view showing the locking means; and

Figure 5 is a section taken on the line 5—5 of Figure 4.

The preferred form of my invention, as shown in the drawings, comprises a pair of jaws 1 and 2, the lower jaw 2 adapted to bear on the frame of the engine adjacent the lower end of the valve stem, and the jaw 1 adapted to be inserted beneath the collar 3 which is disposed at the lower end of the valve spring 4. The jaw 2 extends rearwardly in the form of a bar 5 having a handle portion 6 on its rear end. The jaw 1 extends rearwardly in the form of a bar 7 which is pivoted at 8 to the bar 5. Pivoted also at 8 is an operating lever 9 having a handle portion 10. A link 11 is pivotally connected at 12 to the bar 9 and pivotally connected at 13 to the bar 7.

The bar or lever 9 is preferably made and is shown in the form of a channel bar having its channel facing downwardly and within which is disposed a cam or tapered wedge 14. This wedge is connected by a link or rod 15 to a manually operated lever 16. This lever is held in the position shown in Fig. 2 by means of a spring 17 connected at one end to the lever 16 and at the other end to the pin 18 on which the lever 16 is pivoted. This wedge 14 is adapted when moved forward by the operation of lever 16 to engage with the upper end of a channel sleeve 19 pivoted on the pin or detent 20. This pin 20 extends between the channelled walls of the bar or lever 9 and acts as a detent or means engaged by the latching lever or arm 21.

As shown in Fig. 2, a locking lever or arm 21 is pivoted at 22 within the channel of the bar 5 and is provided along its upper edge with a plurality of teeth, such as 23. These teeth are properly designed and intended to engage with the pin 20. The arm 21 normally tends to be held against or moved toward the pin 20 by means of the spring 24 one end of which is connected to the lever 9 and the other end of which is connected to the arm 21.

When the handle members 10 and 6 are open, the pin 20 is engaged with one of the upper of the set of teeth 23 to prevent these handle members from being further separated. In the operation of the device, however, after the jaws 1 and 2 have been inserted in the position above mentioned, the handle portions 6 and 10 are moved together, and as this action takes place, the pin 20 rides down over the teeth 23; and when the handle members are in their lowest position, as shown in Fig. 2, the pin 20 is disposed beneath the lowest tooth on the arm 21. The spring 24 holds the arm 21 over so that the engagement of the teeth with the pin will prevent the separation of the handles 6 and 10. This locking action will permit the mechanic to take his hands off the handle portions 6 and 10 and remove the valve stem 25 together with the valve connected thereto while the tool is holding the spring 4 in its elevated position.

When the valve or the stem or both have been repaired and have been replaced and the small pin 26 reinserted in the stem 25, then it is necessary to lower the spring 4. This is effected by pulling on the lever 16, which causes the wedge 14 to move down to the position shown in Fig. 1. This forward movement of the wedge 14 causes the movement of the sleeve 19, which forces the arm 21 and its teeth 23 away from the pin 20 against the action of the spring 24. This disengagement of the teeth from the pin permits the elevation or separation of the handles 6 and 10, whereby the jaws can be moved together and permit the lowering of the spring 4 with its collar 3 against the pin 26.

What I claim is:

1. A valve lifting device comprising a pair of handle bars adapted to be moved relative to each other, a pin on one of said handle bars, a pivoted latch member on the other handle portion, a plurality of teeth on said latch member, means for holding said latch member and teeth in engagement with the pin, the shape of the teeth permitting movement of the pin with respect to the latching member in one direction to prevent the movement of the pin with respect to the teeth in the opposite direction, a pivoted sleeve disposed adjacent the latching member and adapted when moved to disengage the latching member from the pin, and manually operated means for moving the pivoted sleeve to disengage the latching member from the pin and permit the relative movement of the handle portions in the opposite direction.

2. A valve lifting device comprising a pair of handle bars adapted to be moved relative to each other, a pin on one of said handle bars, a pivoted latch member on the other handle portion, a plurality of teeth on said latch member, means for holding said latch member and teeth in engagement with the pin, the shape of the teeth permitting movement of the pin with respect to the latching member in one direction to prevent the movement of the pin with respect to the teeth in the opposite direction, a pivoted sleeve disposed adjacent the latching member and adapted when moved to disengage the latching member from the pin, a cam adapted when moved to engage the pivoted sleeve to release the latching member from the pin, and a manually operated connection to said cam.

3. A valve lifting device including a pair of handle bars adapted to be moved relatively to each other, a pin on one of said bars, a pivoted latch member on the other of said bars, a plurality of teeth on said latch member, means for holding said latch member and teeth in engagement with the pin, the shape of the teeth permitting the movement of the pin with respect to the latch member in one direction only to prevent the movement of the pin with respect to the teeth in the opposite direction, a movable member disposed adjacent the latch member to move it away from the pin, and a manually operated wedge to engage the movable member when actuated in one direction and move the member, whereby it disengages the latch member from the pin and permits the relative movement of the handle portion in the opposite direction.

ROBIN I. SHIBIYA.